United States Patent
Keh et al.

(10) Patent No.: US 12,385,183 B2
(45) Date of Patent: Aug. 12, 2025

(54) METHOD AND INTEGRATED SYSTEM FOR NON-AQUEOUS SOLVENT MEDIUM (NASM) DYEING OF MULTIPLE FORMS OF SYNTHETIC, NATURAL AND BLENDED TEXTILES

(71) Applicant: The Hong Kong Research Institute of Textiles and Apparel Limited, Hong Kong (CN)

(72) Inventors: Edwin Yee Man Keh, Hong Kong (CN); Lei Yao, Hong Kong (CN); Alex Hok Chung Chan, Hong Kong (CN); John Kin Ming Leung, Hong Kong (CN); Jason Lap Hung Chan, Hong Kong (CN); Wendy Lee Ying Yu, Hong Kong (CN)

(73) Assignee: The Hong Kong Research Institute of Textiles and Apparel Limited, Hong Kong (CN)

( * ) Notice: Subject to any disclaimer, the term of this patent is extended or adjusted under 35 U.S.C. 154(b) by 1080 days.

(21) Appl. No.: 17/309,910

(22) PCT Filed: Mar. 13, 2019

(86) PCT No.: PCT/CN2019/077961
§ 371 (c)(1),
(2) Date: Jun. 29, 2021

(87) PCT Pub. No.: WO2020/181521
PCT Pub. Date: Sep. 17, 2020

(65) Prior Publication Data
US 2022/0112655 A1   Apr. 14, 2022

(51) Int. Cl.
*D06P 1/94* (2006.01)
*D06B 9/02* (2006.01)
*D06B 23/20* (2006.01)
*D06P 1/16* (2006.01)
*D06P 5/00* (2006.01)

(52) U.S. Cl.
CPC .................. *D06P 1/94* (2013.01); *D06B 9/02* (2013.01); *D06B 23/205* (2013.01); *D06P 1/16* (2013.01); *D06P 5/001* (2013.01)

(58) Field of Classification Search
CPC ... D06P 1/16; D06P 1/94; D06P 5/001; D06B 9/02; D06B 23/205
See application file for complete search history.

(56) References Cited

U.S. PATENT DOCUMENTS

2012/0030884 A1* 2/2012 Carlson ............ D06P 1/94
8/618

FOREIGN PATENT DOCUMENTS

| CN | 2688735 | * | 3/2005 | ............ D06B 19/00 |
| CN | 2688735 Y | | 3/2005 | |
| CN | 101078154 | * | 11/2007 | ............ D06B 5/16 |
| CN | 100359091 C | | 1/2008 | |
| CN | 101413191 | * | 4/2009 | ............ D06B 1/04 |
| CN | 102776740 | * | 11/2012 | ............ D06B 23/14 |
| CN | 103741523 A | | 4/2014 | |
| CN | 104643427 | * | 5/2015 | |
| CN | 105088581 | * | 11/2015 | ............ D06B 19/00 |
| JP | 2002371480 | * | 12/2002 | ............ D06P 1/34 |
| KR | 20050111982 | * | 11/2005 | |
| KR | 101392306 | * | 5/2014 | ............ B01J 3/008 |

* cited by examiner

*Primary Examiner* — Amina S Khan
(74) *Attorney, Agent, or Firm* — S&F/WEHRW

(57) ABSTRACT

A method and an integrated system for dyeing synthetic, natural, and blended textiles in the form of fabrics, yarns, and garments are provided. The integrated system includes a first pressurizing pump for pressurizing liquefied $CO_2$ to supercritical $CO_2$ (Sc—$CO_2$); a second pressurizing pump for pressurizing $CO_2$ to liquefied $CO_2$; a liquefied $CO_2$ storage vessel for storing the liquefied $CO_2$ and the separated liquefied $CO_2$ from the one or more cyclone separators; a heater for heating the Sc—$CO_2$; a dyestuff vessel for mixing a dyestuff and the Sc—$CO_2$ to obtain Sc—$CO_2$-mixed dyestuff; a dyeing vessel for dyeing the textile by circulating the Sc—$CO_2$ and the Sc—$CO_2$-mixed dyestuff between the dyeing vessel and the dyestuff vessel; and one or more cyclone separators for removing the dyestuff from the Sc—$CO_2$-mixed dyestuff to obtain separated liquefied $CO_2$.

6 Claims, 10 Drawing Sheets

Example 4

Example 5

METHOD AND INTEGRATED SYSTEM FOR NON-AQUEOUS SOLVENT MEDIUM (NASM) DYEING OF MULTIPLE FORMS OF SYNTHETIC, NATURAL AND BLENDED TEXTILES

CROSS-REFERENCE TO RELATED APPLICATIONS

This application claims the benefit of the International Application No. PCT/CN2019/077961, filed on 13 Mar. 2019, which is incorporated by reference herein in its entirety.

FIELD OF THE INVENTION

The present disclosure generally relates to a method and an integrated system for dyeing synthetic, natural, and/or blended textiles in the form of fabrics, yarns, and garments. More particularly, the textile is dyed by non-aqueous solvent medium using supercritical carbon dioxide (Sc—$CO_2$) as a dyeing solvent.

BACKGROUND OF THE INVENTION

Polyesters such as polyethylene terephthalate (PET) and cotton are common clothing materials. Over 75% of all fabric used in the world are made from PET, cotton and PET/cotton blends. Traditional aqueous dyeing processes require large amounts of water. The wastewater from dyeing contains pollutants and results in water pollution. With widespread increasing environmental awareness, the textile industry is seeking more environmentally friendly alternatives for textile dyeing in order to tackle the enormous amount of wastewater produced every day around the world. One alternative is to use a non-aqueous solvent medium (NASM), in particular supercritical carbon dioxide (Sc—$CO_2$), in the dyeing process.

Sc—$CO_2$, which exists at conditions greater than the critical temperature of 304.25 K and the critical pressure of 74 bar, is a type of fluid having properties of both gas and liquid. It has advantages of gas such as low viscosity, high diffusivity and very low surface tension. At the same time, it has excellent solubility and can dissolve materials like liquid. In addition, dyeing textiles using Sc—$CO_2$ have other benefits, such as no extra dyeing auxiliaries required and the non-toxic nature of the Sc—$CO_2$. Thus, Sc—$CO_2$ could potentially replace water as dyeing solvent. Separating the unused dyestuff is relatively easy as compared to other aqueous dyeing methods. In contrast, the unused dyestuff in traditional water dyeing process is mixed with water and extra processing is necessary to recover the unused materials in dyeing. Therefore it is more difficult to achieve recycling of the chemicals.

Most of the other inventions related to Sc—$CO_2$ dyeing system are for laboratory or pilot studies, such as "Rota-Color" from Chematur Engineering AB and the supercritical fluid dyeing pilot plant from Uhde High Pressure Technologies GmbH. The supercritical fluid dyeing pilot plant from Uhde High Pressure Technologies GmbH designed in 1999, for instance, can only dye 3-7 kg of PET yarn cones and reach up to 150° C. and 30 mPa (300 bar). Few Sc—$CO_2$ dyeing systems are designed for commercial scale dyeing. DryCoo™, owned by DyeCoo Textile Systems BV and Yeh Group in 2011, is the first Sc—$CO_2$ dyeing system for industrial production.

Conventional Sc—$CO_2$ dyeing systems are typically designed to only dye a single type of textile material, such as fiber, yarn, fabric or garment. An integrated dyeing system designed for multiple forms of textile has not been designed. Accordingly, there is a need for improved Sc—$CO_2$ dyeing systems that address at least some of the aforementioned needs.

SUMMARY OF THE INVENTION

It is an object of the present disclosure to provide a method and an integrated system for dyeing synthetic, natural, and/or blended textiles, preferably by non-aqueous solvent medium using Sc—$CO_2$ as a dyeing solvent.

In accordance with certain embodiments of the present disclosure, a system for dyeing a textile using liquefied $CO_2$ comprises (1) a first pressurizing pump for pressurizing liquefied $CO_2$ to supercritical $CO_2$ (Sc—$CO_2$); (2) a heater for heating the Sc—$CO_2$; (3) a dyestuff vessel for mixing a dyestuff and the Sc—$CO_2$ to obtain Sc—$CO_2$-mixed dyestuff; (4) a dyeing vessel for dyeing the textile by circulating the Sc—$CO_2$ and the Sc—$CO_2$-mixed dyestuff between the dyeing vessel and the dyestuff vessel; and (5) one or more cyclone separators for removing the dyestuff from the Sc—$CO_2$-mixed dyestuff to obtain separated liquefied $CO_2$.

In accordance with a further aspect of the present disclosure, the system further comprises a second pressurizing pump for pressurizing $CO_2$ to liquefied $CO_2$; and a liquefied $CO_2$ storage vessel for storing the liquefied $CO_2$ and the separated liquefied $CO_2$ from the one or more cyclone separators.

In accordance with a further aspect of the present disclosure, the system further comprises a third pressurizing pump for pressurizing an alcoholic solvent, wherein the alcoholic solvent is selected from the group consisting of methanol, ethanol, and a combination thereof; and the dyestuff is a reactive disperse dye.

In accordance with a further aspect of the present disclosure, the dyestuff vessel comprises a motor, a mesh basket, one or more stirrer blades, and a heating jacket.

In accordance with a further aspect of the present disclosure, the dyeing vessel for dyeing a fabric textile comprises a fabric beam, an inlet and an outlet for circulating the Sc—$CO_2$, and a heating jacket. The dyeing vessel for dyeing a garment textile comprises a garment basket, a garment vessel, a heating jacket, an inlet and an outlet for circulating the Sc—$CO_2$, and a motor. The dyeing vessel for dyeing a yarn textile comprises a yarn beam, a heating jacket, and an inlet and an outlet for circulating the Sc—$CO_2$.

In accordance with a further aspect of the present disclosure, the method for dyeing a textile using liquefied $CO_2$ comprises (1) loading a textile to a dyeing vessel; (2) pressurizing and heating the liquefied $CO_2$ to obtain supercritical $CO_2$ (Sc—$CO_2$); (3) mixing a dyestuff and the Sc—$CO_2$ in a dyestuff vessel at a first temperature and a first pressure to obtain Sc—$CO_2$-mixed dyestuff; (4) circulating the Sc—$CO_2$-mixed dyestuff and the Sc—$CO_2$ between the dyeing vessel and the dyestuff vessel for a dyeing period to dye the textile; (5) rinsing the textile using Sc—$CO_2$ at a second temperature and the first pressure for a rinsing period; and (6) removing the dyestuff from the Sc—$CO_2$-mixed dyestuff by one or more cyclone separators and obtaining separated liquefied $CO_2$.

In accordance with a further aspect of the present disclosure, the method further comprises purifying the separated liquefied $CO_2$ and transferring the separated liquefied $CO_2$ to a liquefied $CO_2$ storage vessel for recycling.

In accordance with a further aspect of the present disclosure, the circulating of the Sc—$CO_2$-mixed dyestuff and the Sc—$CO_2$ between the dyeing vessel and the dyestuff vessel is driven by a circulation pump operating in a single direction or in alternating directions.

In accordance with a further aspect of the present disclosure, the first temperature is in a range of 60° C. to 150° C.; the first pressure is in a range of 140 bar to 280 bar; the second temperature is in a range of 40° C. to 80° C.; the dyeing period is in a range of 30 minutes to 6 hours; and/or the rinsing period is in a range of 10 minutes and 2 hours.

In accordance with a further aspect of the present disclosure, the method further comprises (1) pressurizing an alcoholic solvent; (2) mixing the alcoholic solvent with the Sc—$CO_2$ before supplying the Sc—$CO_2$ to the dyestuff vessel and the dyeing vessel; and (3) removing the alcoholic solvent from the Sc—$CO_2$-mixed dyestuff by one or more cyclone separators. The alcoholic solvent is selected from the group consisting of methanol, ethanol, and a combination thereof. The dyestuff is a reactive disperse dye. The alcoholic solvent is present in a range of 3 wt % to 12 wt % with respect to the Sc—$CO_2$, or in a range of 0.1 wt % to 5 wt % with respect to the Sc—$CO_2$.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects of the present invention are disclosed as illustrated by the embodiments hereinafter.

BRIEF DESCRIPTION OF THE DRAWINGS

The appended drawings, where like reference numerals refer to identical or functionally similar elements, contain figures of certain embodiments to further illustrate and clarify various aspects, advantages and features of the method and system for dyeing textile as disclosed herein. It will be appreciated that these drawings and graphs depict only certain embodiments of the invention and are not intended to limit its scope. The textile dyeing method and system as disclosed herein will be described and explained with additional specificity and detail through the use of the accompanying drawings in which.

DETAILED DESCRIPTION OF THE INVENTION

Figure 1:
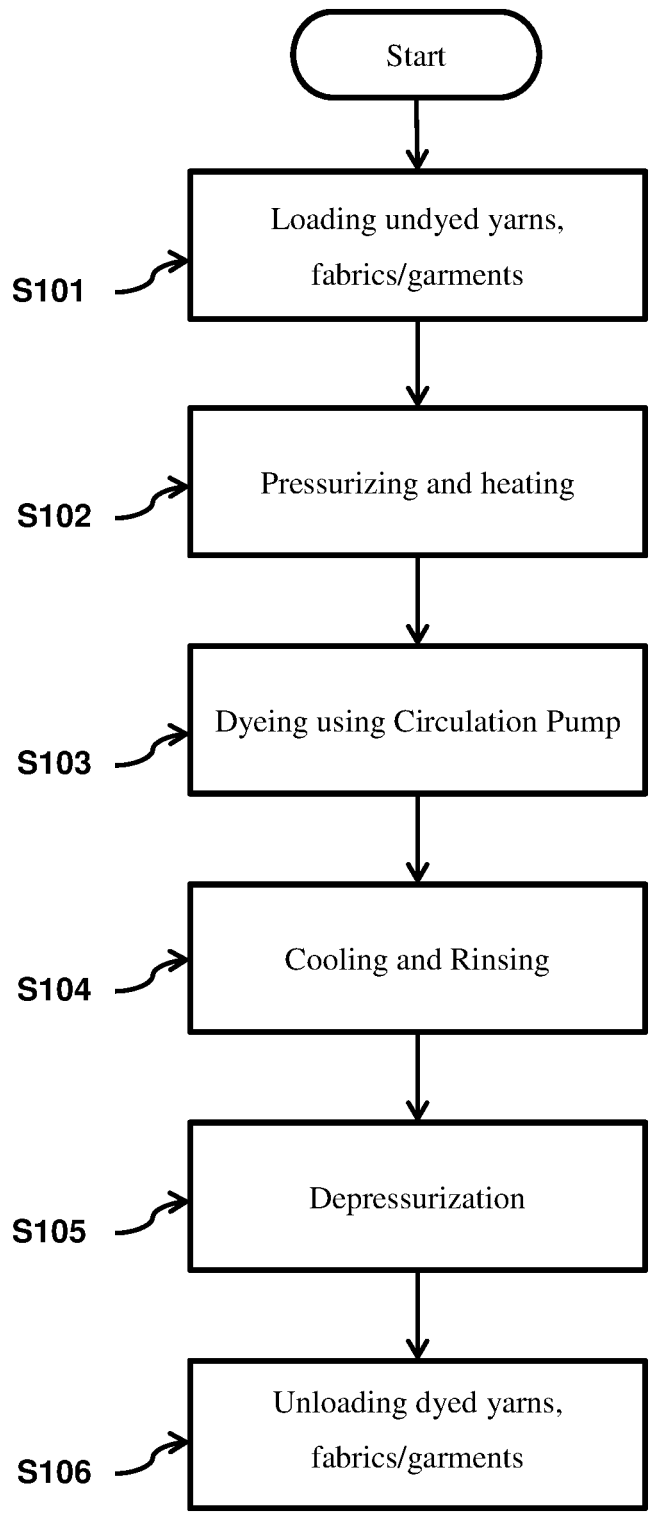
FIG. 1 is a flowchart showing the major steps for dyeing PET, cotton, wool or PET/cotton blended textile using Sc—$CO_2$ in accordance with certain embodiments of the present disclosure.

The present disclosure generally relates to a method and a 2-in-1 dyeing system for dyeing synthetic, natural, and blended textiles using non-aqueous solvent medium (NASM). In particular, the present disclosure uses Sc—$CO_2$. The textile can be in the form of yarns, fabrics or garments.

In the following detailed description, the method, system and device are merely exemplary in nature and are not intended to limit the disclosure or its application and/or uses. It should be appreciated that a vast number of variations exist. The detailed description will enable those of ordinary skill in the art to implement an exemplary embodiment of the present disclosure without undue experimentation, and it is understood that various changes or modifications may be made in the function and arrangement of methods, systems and devices described in the exemplary embodiment without departing from the scope of the present disclosure as set forth in the appended claims. The exemplary embodiments may not be limited to the precise embodiments described below, and may be practiced without some of these specific details. In other instances, structures and methods have not been described in detail, if already well known.

According to the present disclosure, synthetic textiles include, but are not limited to, nylon, polyester, acrylic, and combinations thereof. Exemplary synthetic textiles include polyethylene terephthalate PET, polybutylene terephthalate (PBT), spandex, and polyethylene furanoate (PEF), and any mixtures thereof. In certain embodiments, the synthetic textile is PET.

Natural textiles include, but are not limited to, cotton, flax, linen, wool, cashmere, and silk. In certain embodiments, natural textiles can include semi-synthetics, such as viscose, modal, lyocell, rayon, and the like. In certain embodiments, the natural textile is cotton, wool, or a combination thereof.

Blended textiles can comprises one of more textiles or fibers selected from synthetic textiles or fibers, natural textiles or fibers, and semi-synthetic textiles or fibers. Exemplary blended textiles include, but are not limited to, PET/cotton, wool/PET, nylon/PET, cotton/spandex. In certain embodiments, the blended textile is PET/cotton.

Dyestuff refers to a colored chemical substance that can be used to dye a textile due to the affinity and/or reactivity of the colored substance to the substrate of the textile. Dyestuff may be a disperse dye of any color, a reactive disperse dye of any color, or a mixture of any disperse dye and/or reactive disperse dye, wherein the term "reactive disperse" refers to the capability of reacting with components of the natural textile or blended textile.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Furthermore, as used herein, the term "approximately", when used in conjunction with a numerical value or range of values, refers preferably to a range that is within 10 percent, within 5 percent, or within 1 percent of a value with which the term is associated. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Similar to aqueous dyeing, the choice of dyestuff in the dyeing system mainly relies on the solubility of the dye in $Sc-CO_2$ and the reaction of the dye and the properties of the textile to be dyed. For example, the dyestuff used for dyeing PET may be disperse red, disperse yellow, or a mixture thereof. The dyestuff used for dyeing cotton and wool may be reactive disperse red, reactive disperse yellow, or a mixture thereof. The dyestuff used for dyeing PET/cotton blended may be reactive disperse red, reactive disperse yellow, a mixture of reactive disperse red and disperse red, or a mixture of reactive disperse yellow and disperse yellow.

The quantity of dyestuff added to the system, together with other conditions, can depend on the weight of the textile that is planned to be dyed and the solubility of the dyestuff used in $Sc-CO_2$. In general, the amount of dyestuff added is >0.1% of overall weight fraction (owf) of the textile and ≤10% owf, and preferably between 0% owf and 4% owf. Adding a higher concentration of dyestuff gives the dyed product a greater color strength value as well as a higher absorption (K) to scattering (S) ratio (K/S value). High purity dyes, preferably >95%, is proposed to use for dyeing in the system such that the change of color, the decomposition of dyestuff and the contamination of dyeing process are limited.

The mechanism behind the dyeing process for PET is summarized as follows. PET can undergo swelling at high temperature and high pressure condition. The swollen PET provides more space for $Sc-CO_2$ together with dissolved disperse dyestuff to penetrate inside the fiber of the textile. The retained dyestuff thus is fixed inside the fiber and the textile is dyed in color during cooling. The unfixed dyestuff on the surface is then washed out using $Sc-CO_2$ during rinsing stage, which is performed at condition with lower dyestuff solubility compared to dyeing condition.

For the dyeing of natural fibers like cotton and wool, reactive disperse dye can be used. Reactive disperse dye can react with the hydroxyl functional groups (—OH) of cotton and amine functional groups (—$NH_2$) of wool in the presence of alcoholic solvent, under high temperature and high pressure conditions. The alcoholic solvent can be any alcoholic solvent known in the art. In certain embodiments, the alcoholic solvent is methanol, ethanol, or a combination thereof. The purity of the alcoholic solvent can be >70%, particularly >99%. The amount of alcoholic solvent added to the dyeing vessel by pump depends on the weight of $Sc-CO_2$, preferably between 0.1 wt % and 12 wt %. Similar to the method for dyeing PET as described herein, the unbounded reactive disperse dye can then be rinsed off from the treated natural textiles using $Sc-CO_2$ at lower temperature while the pressure remains the same as the dyeing pressure. In addition, the process flow for dyeing PET/cotton blend can be the same as the dyeing process for cotton and wool.

The selection of the optimal temperature and pressure in the dyeing process typically depends on the solubility of the dye used. In general, disperse dyes have higher solubility at high temperature and pressure. Consequently, PET dyeing in the system is typically conducted at in high temperature and pressure, in particular between 90° C. to 150° C. and 140 bar to 280 bar. Reactive disperse dye typically call for a temperature of between 60° C. to 120° C. and a pressure of 140 bar to 280 bar.

The present disclosure aims to provide an improved method for dyeing textiles, such as garment, fabric, and yarn, in a green and sustainable manner without the use of water.

FIG. 1 is a flowchart showing the major steps for NASM dyeing PET, cotton, wool or PET/cotton blended textile in accordance with the present disclosure. The method comprises the steps: (1) loading undyed yarns, fabrics, and/or garments S101; (2) pressurizing and heating S102; (3) dyeing using circulation pump S103; (4) cooling and rinsing S104; (5) depressurizing S105; and (6) unloading dyed yarns, fabrics, and garments S106.

After loading undyed yarns, fabrics, and/or garments S101 to the dyeing vessel 303, pressurizing and heating S102 are performed on the dyestuff vessel 302 for preparing the appropriate dyeing condition. The temperature and pressure conditions vary depending on the type of material for being dyed. The dyestuff vessel 302 includes a removable stainless steel mesh basket for dyestuff. After pressurizing and heating S102 the dyestuff vessel 302 to the dyeing condition of 140 bar to 280 bar and 60° C. to 150° C., the dyeing system 300 is ready to perform dyeing using circulation pump S103. A motor driven stirrer is turned on for internal circulation inside the dyeing vessel 302 so that $Sc-CO_2$ dissolves the dyestuff contained in the mesh basket, and the $Sc-CO_2$-mixed dyestuff 211 can enter the dyeing vessel 303 for dyeing using circulation pump S103.

In the cooling and rinsing S104 step, a lower temperature of 40° C. to 80° C. is used, whereas the pressure is maintained the same as the pressure used in the dyeing stage at 140 bar to 280 bar. The rinsing process comprises continuous supply of fresh $Sc-CO_2$ for a rinsing period of approximately 10 minutes to 2 hours, particularly between 15 minutes to 1 hour, depending on the amount of unfixed dyestuff and/or $Sc-CO_2$ soluble impurities or side products remaining on the textiles.

After rinsing, the $Sc-CO_2$ is turned into liquefied $CO_2$ by performing depressurization S105, such that the dyestuff and any solvents (e.g., an alcoholic solvent) used are separated during the phase change of $CO_2$. The dyestuff and any solvents collected can be reused in the dyeing process. The dyed yarns, fabrics, and/or garments can be unloaded S106.

Figure 2:
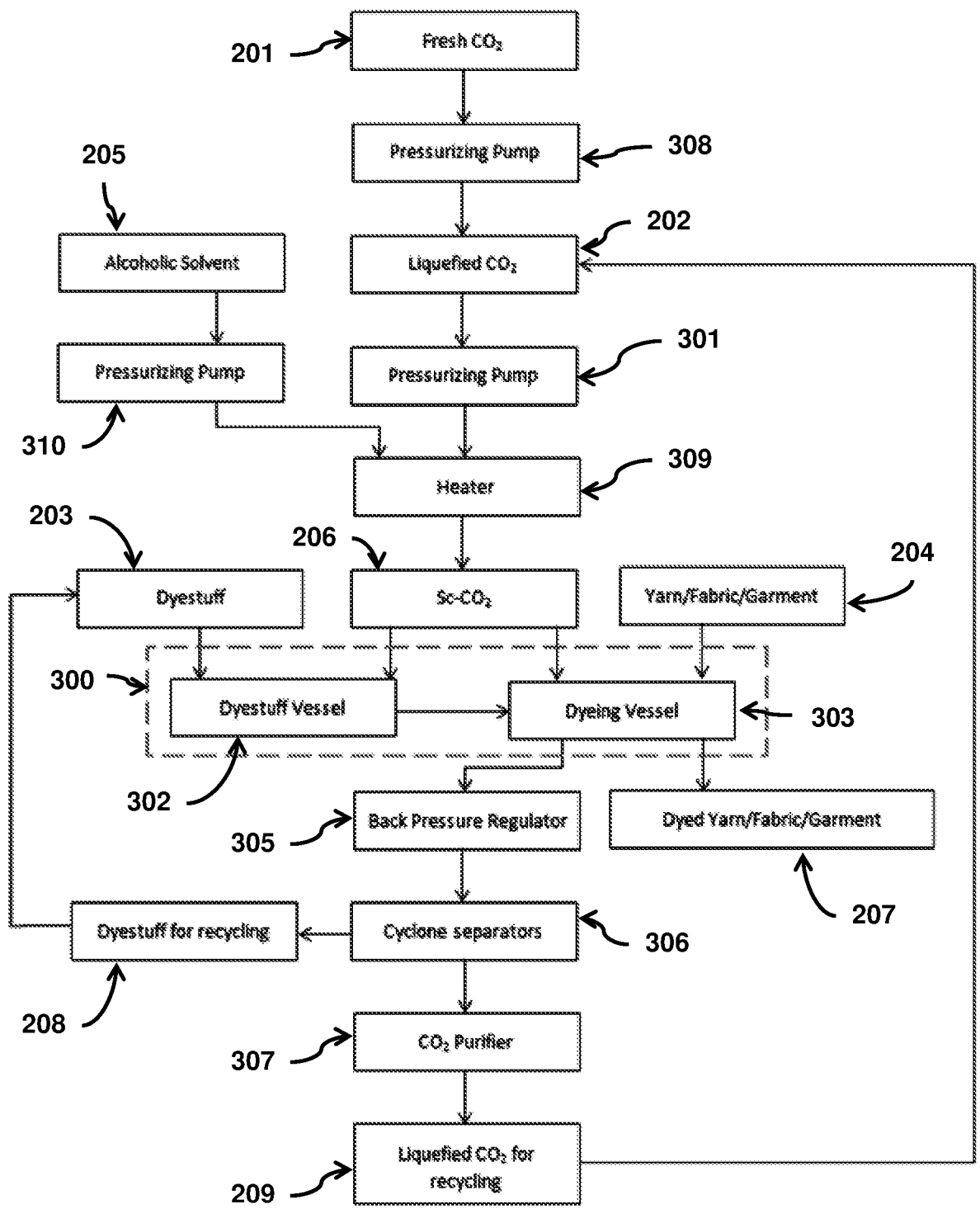
FIG. 2 is a flowchart showing the method for dyeing PET, cotton, wool or PET/cotton blended textile using Sc—$CO_2$ in accordance with certain embodiments of the present disclosure.
Figure 3:
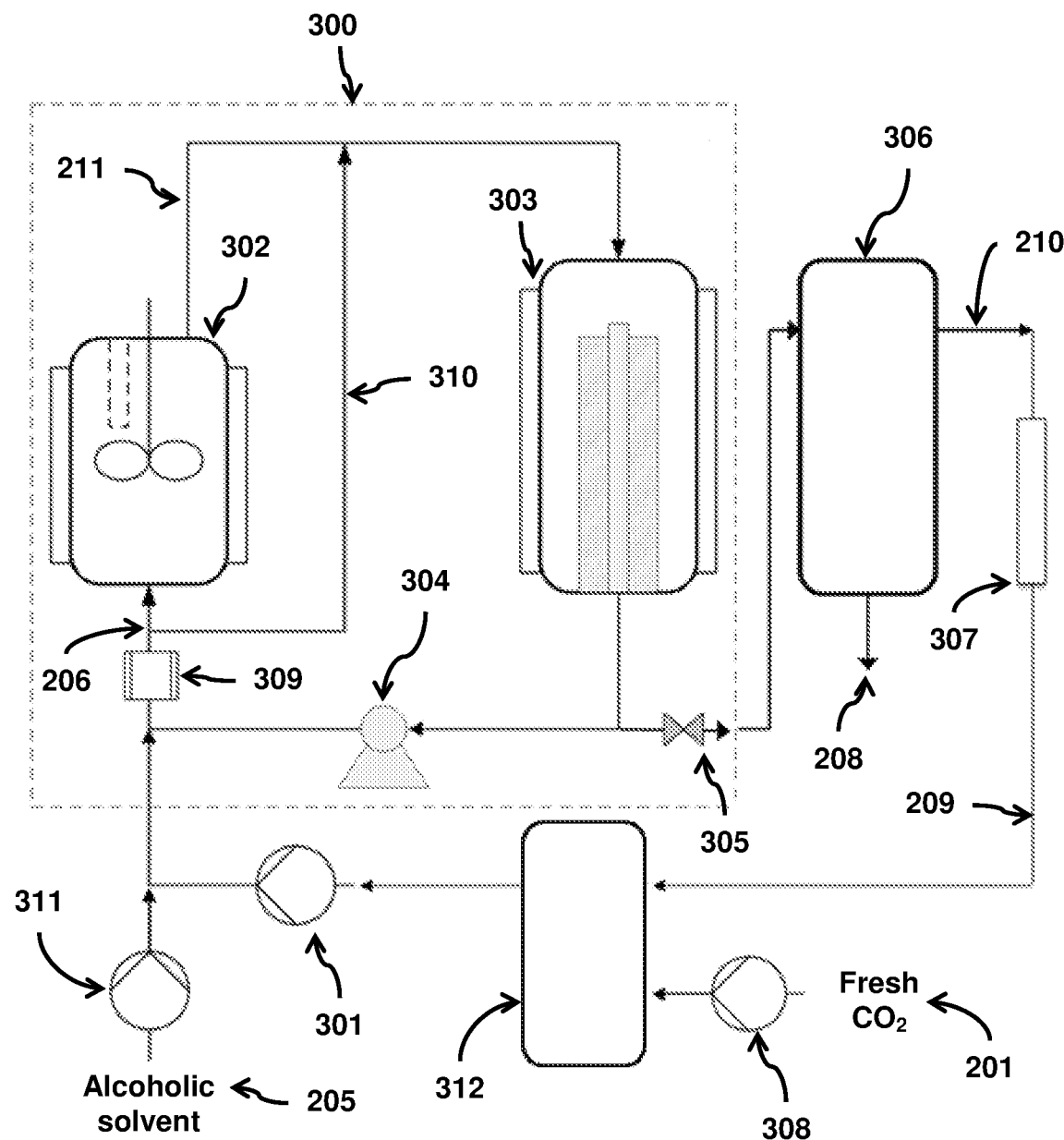
FIG. 3 is a schematic diagram showing the structure of the system for dyeing PET, cotton, wool or PET/cotton blended textile using Sc—$CO_2$ in accordance with certain embodiments of the present disclosure.

Now referring to FIGS. 2 and 3, FIG. 2 is a flowchart showing the method for NASM dyeing PET, cotton, wool or PET/cotton blended textile using Sc—$CO_2$, while FIG. 3 is a schematic diagram showing the corresponding structure. The dyeing system 300 is a 2-in-1 dyeing system comprising a dyestuff vessel 302 and a dyeing vessel 303, and uses fresh $CO_2$ 201 or recycled liquefied $CO_2$ 209 for dyeing synthetic, natural, and/or blended textiles.

The fresh $CO_2$ 201 is pressurized by a pressurizing pump 308 to obtain liquefied $CO_2$ 202. In certain embodiments, the fresh $CO_2$ 201 is pressurized to approximately 20 bar to 150 bar. The liquefied $CO_2$ 202, mixed with any recycled liquefied $CO_2$ 209, is stored in a liquefied $CO_2$ storage vessel 312 at a temperature preferably between −20° C. to 20° C. The liquefied $CO_2$ 202, 209 is then transferred to another pressurizing pump 301 for further pressurization. The preferred pressure for obtaining Sc—$CO_2$ 206 for the purpose of the present disclosure is between 140 bar to 280 bar. For dyeing cotton, wool, or PET/cotton blended textile, the further pressurized liquefied $CO_2$ is mixed with alcoholic solvent 205, for example, methanol or ethanol, which is also pressurized by a pressurizing pump 311. After mixing, there is approximately 0.1 to 12 weight percent (wt %) of alcoholic solvent 205, with respect to the weight of the Sc—$CO_2$, and preferably between 0.1 to 5 wt % of alcoholic solvent 205. For dyeing PET textile, no alcoholic solvent 205 is mixed with the pressurized liquefied $CO_2$. As the preferred temperature of the Sc—$CO_2$ 206 for dyeing PET is between 90° C. to 150° C., and the preferred temperature of the Sc—$CO_2$ 206 for dyeing natural textiles or blended textiles is between 60° C. to 120° C., the pressurized liquefied $CO_2$ is heated to the preferred temperature by a heater 309. The heater 309 can be, for example, a steam heat exchanger, a water heat exchanger, or an electrical heater. The obtained Sc—$CO_2$ 206 is used for both the dyestuff vessel 302 and dyeing vessel 303. The Sc—$CO_2$ 206 is the dyeing solvent replacing water.

Figures 4A, 4B:
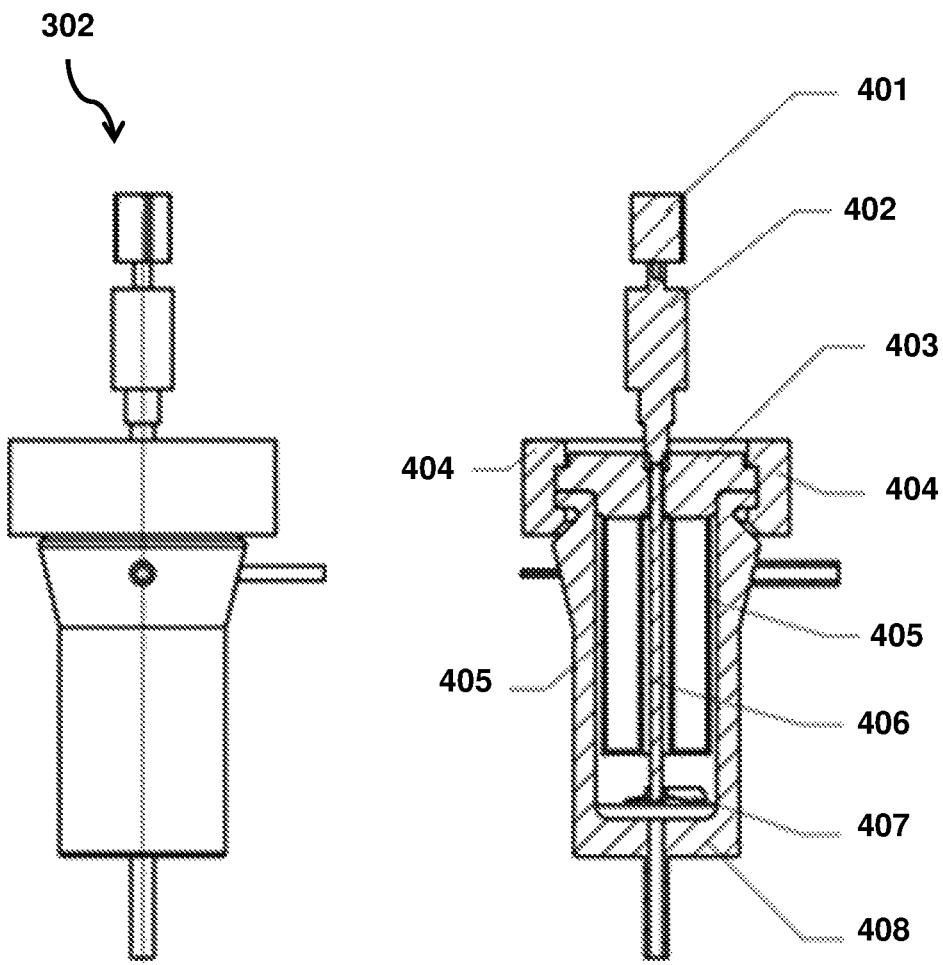
FIG. 4A is a diagram showing the dyestuff vessel of the dyeing system.
FIG. 4B is a structural schematic diagram showing the components of the dyestuff vessel of the dyeing system.

The dyestuff vessel 302 can be provided with a motor driven rotating stirrer, comprising a motor 401, a mesh basket 405, one or more stirrer blades 407, and a heating jacket 408. The dyestuff 203 and Sc—$CO_2$ 206 are mixed in the dyestuff vessel 302. The choice of dyestuff 203 in the dyeing system 300 mainly relies on the solubility of the dyestuff 203 in Sc—$CO_2$ and the reaction of the dyestuff 203 and the nature of textile. An exemplary dyestuff vessel 302 is shown in FIG. 4A, and FIG. 4B illustrates the internal structure thereof. The amount of dyestuff is with respect to the weight of fabric.

The dyestuff 203 and Sc—$CO_2$ 206 are mixed by an internal circulation inside the dyeing vessel 302 driven by the rotational force of the one or more stirring blades 407 to obtain the Sc—$CO_2$-mixed dyestuff 211. The stirring blades 407 are twisted and arranged to form preferably an axial flow impeller, or alternatively a radial flow impeller (hereinafter referred to as an "impeller"). The center of the impeller is connected longitudinally to a motor 401 along a stirrer axis 406. The motor 401 is driven by a magnetic drive 402. The motor 401 may employ other driving method for controlling the stirring blades 407 without departing from the spirit of the present disclosure. The impeller can generate a downward and then upward flow of the Sc—$CO_2$ 206 for mixing and dissolving the dyestuff 203 contained in the mesh basket 405. As the mixing is operated at a predetermined temperature, a heating jacket 408 is provided at the body of the dyestuff vessel 302. On the top of the dyestuff vessel 302, a cover 403 and a plurality of cover locks 404 are used for opening and hermetically sealing the dyestuff vessel 302. It is preferred that the cover 403 and the mesh basket 405 are made of stainless steel.

The Sc—$CO_2$ 206 is also supplied to the dyeing vessel 303 through a bypass channel 310, and the Sc—$CO_2$-mixed dyestuff 211 is also supplied to the dyeing vessel 303 for performing textile dyeing. The yarn/fabric/garment 204 is first loaded to the dyeing vessel 303. Depending on the type of textile, there are three types of dyeing vessels 303 to be installed to the dyeing system 300, including fabric dyeing vessel 303A for dyeing fabrics, garment dyeing vessel 303B for dyeing garments, and yarn dyeing vessel 303C for dyeing yarns. In order to perform dyeing of textiles, a circulation pump 304 is used for continuously circulating the Sc—$CO_2$ 206 and the Sc—$CO_2$-mixed dyestuff 211 between the dyeing vessel 303 and the dyestuff vessel 302. The circulation pump 304 is preferably an electrically powered centrifugal pump, which can thrust the Sc—$CO_2$ 206 and the Sc—$CO_2$-mixed dyestuff 211 into the heater 309 or the dyestuff vessel 302. The circulation can be performed in either direction, and not necessarily to be operated in the direction as indicated in FIG. 3. The circulation can also be in alternating directions by operating the circulation pump 304 in an alternating manner, i.e. clockwise, counterclockwise, clockwise, etc.

Figure 5:
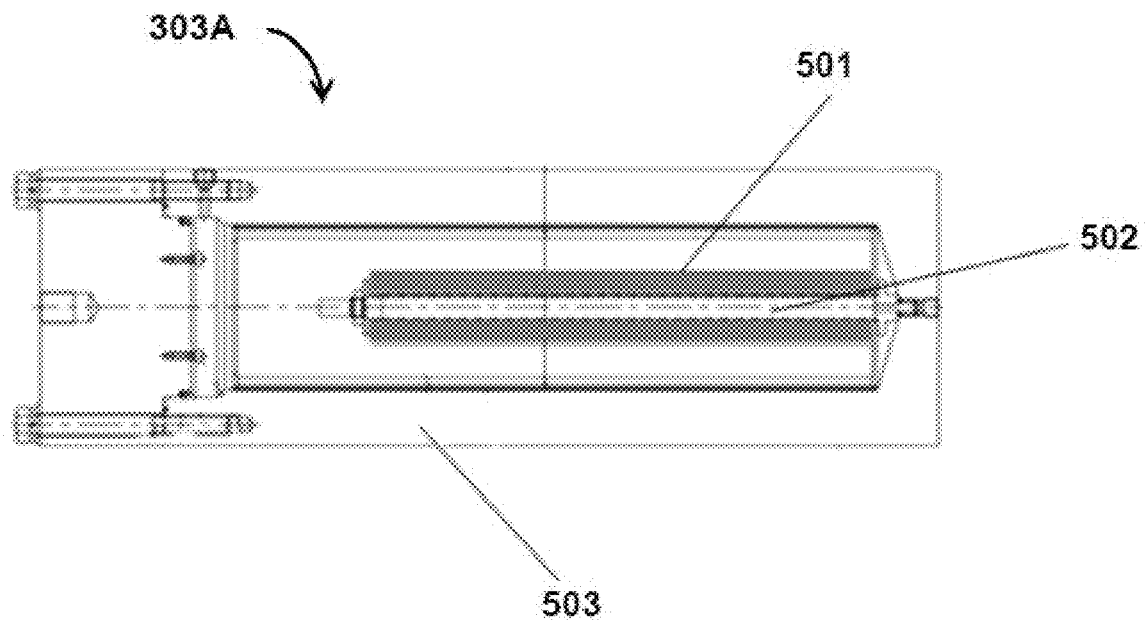
FIG. 5 is a structural schematic diagram showing the components of the fabric dyeing vessel of the dyeing system.
Figure 9A:
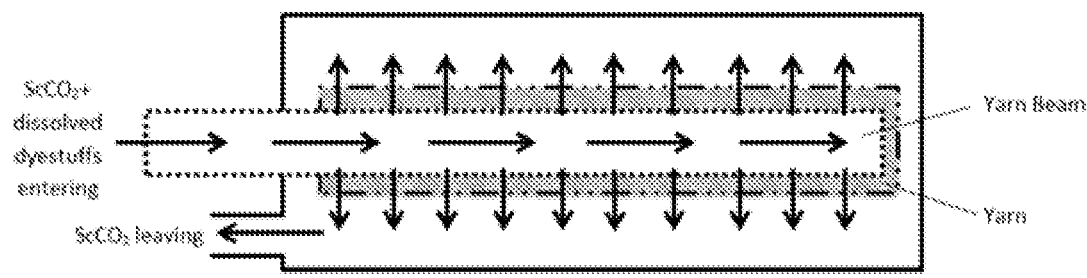
FIG. 9A is a diagram illustrating a flow of Sc—$CO_2$ entering the yarn dyeing vessel in the process of dyeing.
Figure 9B:
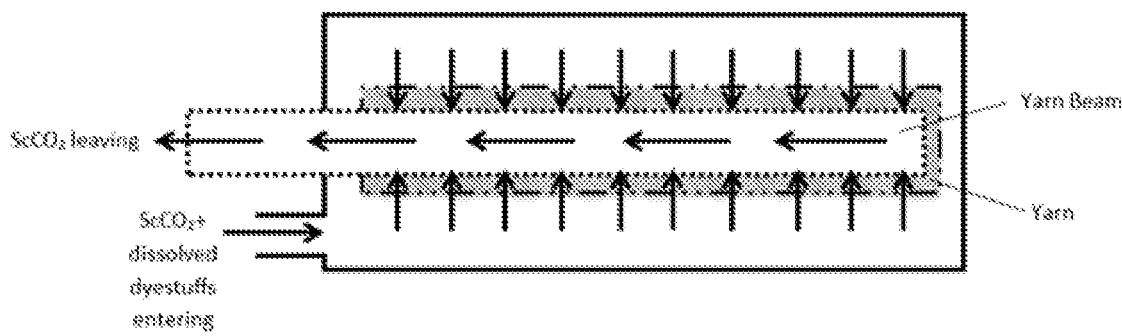
FIG. 9B is a diagram illustrating an alternative flow of Sc—$CO_2$ entering the yarn dyeing vessel in the process of dyeing.

FIG. 5 illustrates a fabric dyeing vessel 303A in accordance with certain embodiments of the present disclosure. The fabric dyeing vessel 303A comprises a fabric beam 502, an inlet and an outlet for circulating the Sc—$CO_2$, and an electrical heating jacket 503. The heating jacket 503 is preferably an electrical heating jacket and applies heat to the fabric loaded into the fabric dyeing vessel 303A, such that the dyeing operation can be performed at the preferred temperature range of 90° C. to 150° C. for PET, or 60° C. to 120° C. for cotton, wool or PET/cotton blend. As substantially surrounded by the heating jacket 503, the dyeing process can be operated at the preferred temperature. The fabric beam 502 is used to tighten the fabrics at position 501 for dyeing. The weight of the fabrics is usually in a range from 10 g to 40 kg, particularly 100 g to 20 kg. The fabric beam 502 is a stainless steel cylindrical shell with holes for the flow of Sc—$CO_2$ and dyestuff. In the case of a forward flow, the Sc—$CO_2$-mixed dyestuff 211 is flowed from an inlet connecting on the wall to the fabric dyeing vessel 303A to an outlet at the end of the fabric beam 502, or vice versa, for a backward flow. A similar flow illustrating inlet and outlet of Sc—$CO_2$-mixed dyestuff 211 for the case of yarn dyeing vessel 303C is shown in FIG. 9, which can also be applied to the fabric dyeing vessel 303A in FIG. 5. Circulating the Sc—$CO_2$-mixed dyestuff 211 using either direction of flow or alternatively switching between the two directions is feasible in the dyeing system 300.

Figure 6:
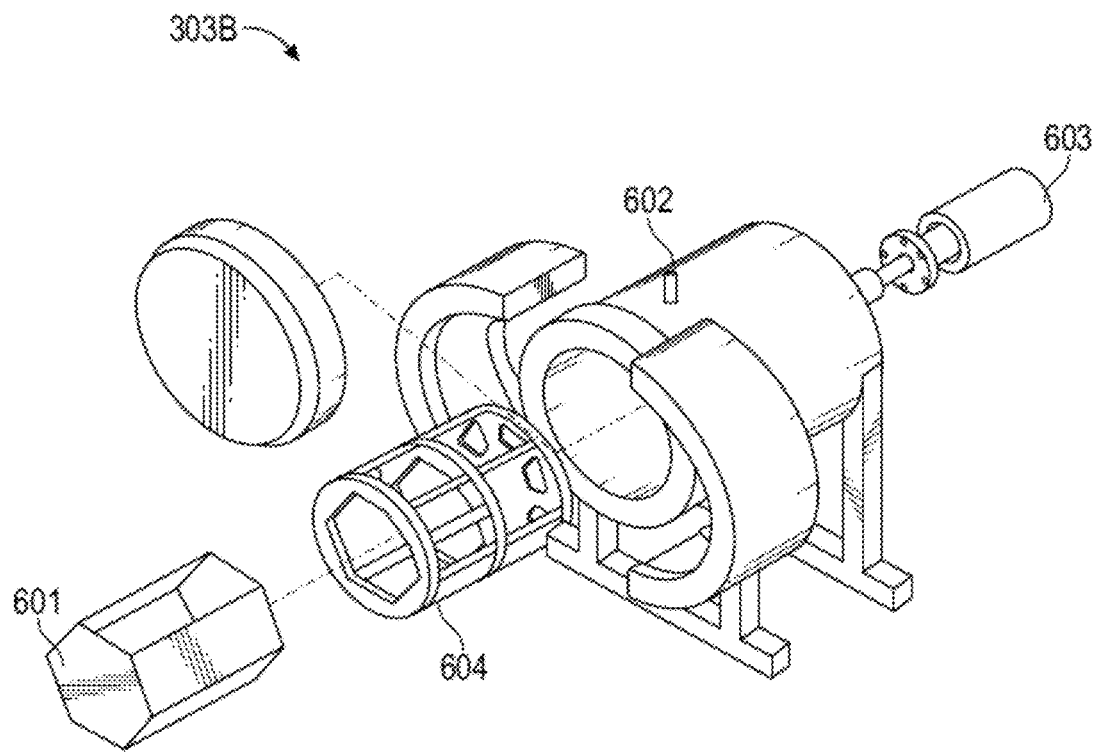
FIG. 6 is a structural schematic diagram showing the components of the garment dyeing vessel of the dyeing system.
Figure 7:
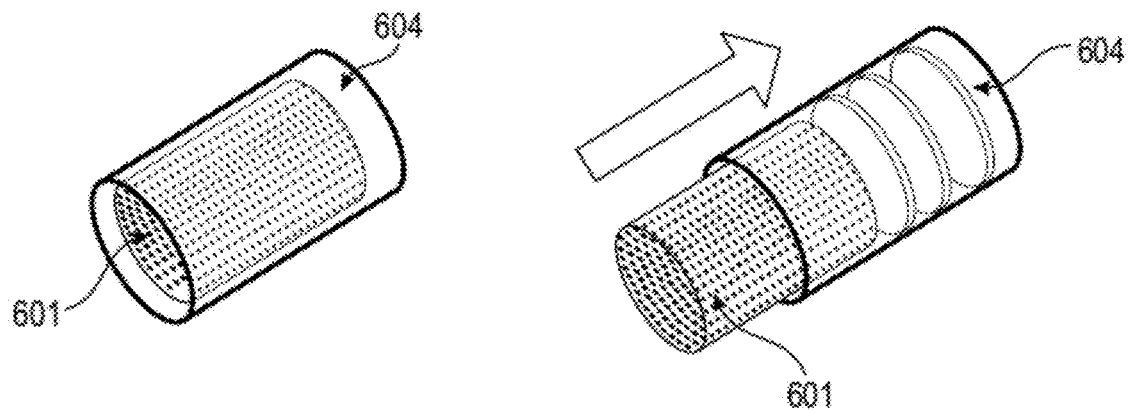
FIG. 7 is a diagram illustrating the movement of the garment basket in the garment dyeing vessel of the dyeing system.

FIG. 6 illustrates a garment dyeing vessel 303B in accordance with certain embodiments of the present disclosure. The garment dyeing vessel 303B comprises a garment basket 601, a garment vessel 604, a heating jacket 602, an inlet and an outlet for circulating the Sc—$CO_2$, and a motor 603. The garment basket 601 is preferably in hexagonal shape, which is a movable stainless steel container. The weight of the garment is typically in a range of 100 g to 5 kg. The garment is dyed during rotary of the garment basket 601. The garment is packed or hung inside the garment basket 601 for dyeing. The rotation is driven by the motor 603. The heating jacket 602 is preferably an electrical heating jacket and applies heat to the garment loaded into the garment dyeing vessel 303B, such that the dyeing operation can be performed at the preferred temperature range of 90° C. to 150° C. for PET, or 60° C. to 120° C. for cotton, wool or PET/cotton blend. Rotating the garment basket 601 in clockwise, anti-clockwise or alternatively bidirectional manner is feasible in the dyeing system 300. As shown in FIG. 7, the garment basket 601 is fixed inside the garment vessel 604 after loading the garment into the garment basket 601 for dyeing.

Figure 8:
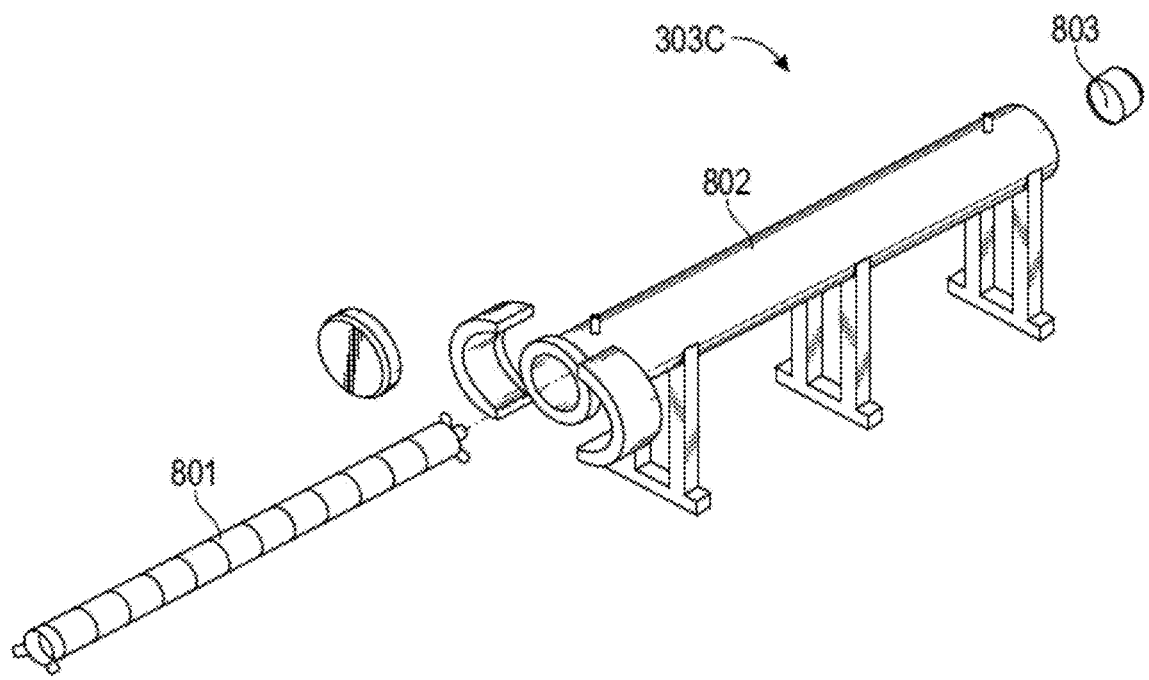
FIG. 8 is a structural schematic diagram showing the components of the yarn dyeing vessel of the dyeing system.

FIG. 8 illustrates a yarn dyeing vessel 303C in accordance with certain embodiments of the present disclosure. The yarn dyeing vessel 303C comprises a yarn beam 801, a heating jacket 802, and an inlet and an outlet for circulating the Sc—$CO_2$ 803. The yarn beam 801 is a movable beam used for loading yarn cones. Typically, the yarn cones have a total weight in a range from 20 g (1 yarn cone) to 40 kg (10-20 yarn cones). Similar to the structure of the fabric dyeing vessel 303A, the yarn beam 801 is a stainless steel cylindrical shell with holes for the flow of Sc—$CO_2$ and dyestuff. Yarn cones are dyed by forward flow, backward flow or alternative flow. FIG. 9 depicted two different flows of the Sc—$CO_2$ 206 and the Sc—$CO_2$-mixed dyestuff 211 in the yarn dyeing vessel 303C. The inlet and the outlet are interchangeable. The heating jacket 802 is preferably an electrical heating jacket and applies heat to the garment loaded into the yarn dyeing vessel 303C, such that the dyeing operation can be performed at the preferred temperature range of 90° C. to 150° C. for PET, or 60° C. to 120° C. for cotton, wool or PET/cotton blend.

The dyeing vessel 303 is preferred to be used for a specific type of textile. However, it shall be understood that the dyeing vessel 303 exhibits the potential for dyeing multiple types of textile. The dyeing system 300 of the present disclosure can advantageously dye the textile in a green, profitable, and sustainable manner without the use of water. After completing dyeing using circulation pump S103, the dyeing vessel 303 is cooled and the textile is rinsed accordingly.

For rinsing PET, a lower temperature, preferably between 70° C. and 100° C., is used. The pressure is maintained the same as the pressure used in the dyeing stage at 140 bar to 280 bar. The unfixed dyestuff on the textile is then rinsed off by the flow of Sc—$CO_2$ 206.

For rinsing cotton, wool and cotton/PET blend, a lower temperature, preferably between 40° C. and 80° C., is used. The pressure is maintained the same as the pressure used in the dyeing stage at 140 bar to 280 bar. The unfixed dyestuff and/or Sc—$CO_2$ soluble impurities or side products on the textile is then rinsed off by the flow of Sc—$CO_2$ 206. After depressurization, the dyed yarn/fabric/garment 207 can be unloaded from the dyeing vessel 303.

The pressure in the dyeing system 300 can be maintained using a back pressure regulator 305, which can allow a flow of the Sc—$CO_2$ 206 and the Sc—$CO_2$-mixed dyestuff 211 to the cyclone separators 306 when the pressure is higher than the expected range. The cyclone separators 306 can separate dyestuff and solvent from Sc—$CO_2$. A cyclone separator 306 is a separation device that can filter heavier substance from lighter substance. Other separation devices, such as a centrifuge, may also be used to replace the cyclone separators 306 for achieving the same purpose.

In the cyclone separators 306, the temperature and pressure are usually lower than those in the dyeing vessel 303. Due to difference of temperature and pressure, the Sc—$CO_2$ turns into liquefied $CO_2$. The dyestuff and solvents (for the case of cotton, wool, and cotton/PET blend) are separated during the phase change of Sc—$CO_2$ to $CO_2$. Preferably, at least two cyclone separators 306 are used to ensure that most of the dyestuff are separated and precipitated at the bottom of the cyclone separators 306. The collected dyestuff and solvent 208 can be reused in the dyeing process. The two cyclone separators 306 are operated at relatively low temperature and low pressure, particularly at around 30° C. to 80° C. and 20 bar to 150 bar. Preferably, the first cyclone separator 306 is operated at around 50° C. to 80° C. and 70 bar to 150 bar, particularly 60° C. to 80° C. and 100 bar to 140 bar. The second cyclone separator 306 is operated at around 30° C. to 50° C. and 20 bar to 60 bar, particularly 30° C. to 50° C. and 20 bar to 50 bar. The two cyclone separators 306 are designed for separating dyestuff, alcoholic solvent and $CO_2$.

The separated $CO_2$ 210 from the cyclone separators 306 is then purified by $CO_2$ purifier 307 and recycled. The recycled $CO_2$ 209 is transferred and stored in liquefied $CO_2$ storage vessel 312 for recycling.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

EXAMPLE 1

Figure 10:
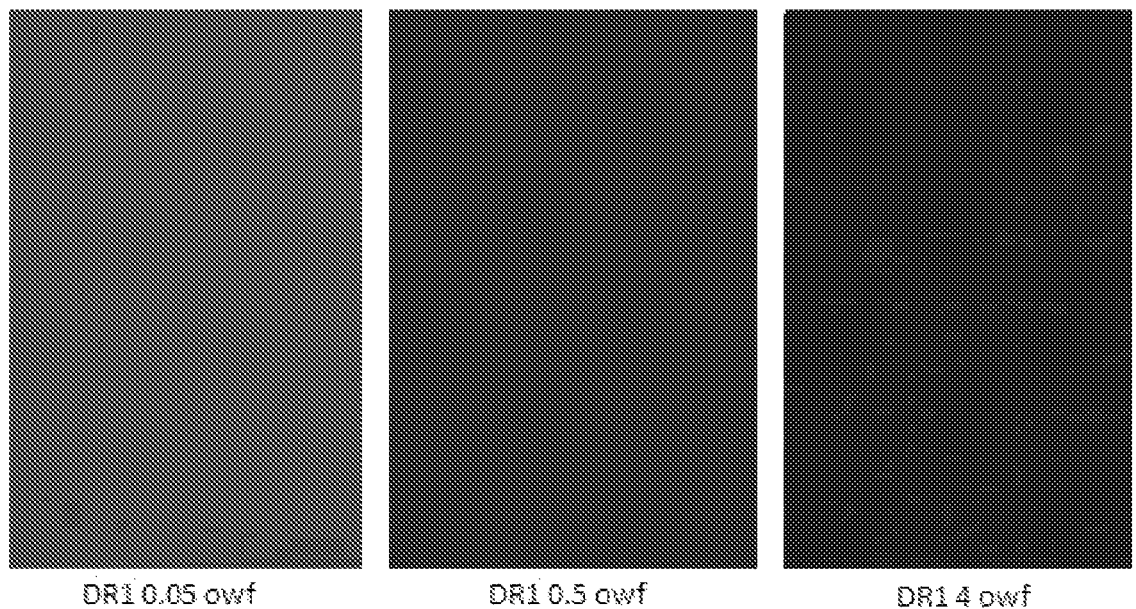
FIG. 10 shows the color sample of the dyed textiles as described in Example 1.

FIG. 10 shows the color sample of the dyed fabrics for Example 1. The images in FIG. 10, although depicted in grayscale (not shown in color), are taken from a color version where the colors range from cardinal (hex=#AE1437) on the left to red (hex=#770311) in the middle and dark purple (hex=#360A0D) on the right side.

The textile sample used in Example 1 is a textile made of 98% PET/2% spandex fabric, which is dyed with a disperse red (DR1) by the process and system of the present disclosure. Three dyeing batches of different concentrations of DR1, 0.05% owf (on weight of fiber), 0.5% owf, and 4% owf, are added to the mesh basket 405 of the dyestuff vessel 302. For each dyeing batch, 15 kg of textile sample is fixed on the fabric beam 502, and the fabric dyeing vessel 303A is operated at 130° C. and 260 bar with 3 hours of circulation using the circulation pump 304. An alternating flow with an interval of 30 minutes is used, such that the Sc—$CO_2$ 206 enters the fabric dyeing vessel 303A from two different directions. After dyeing, the fabric dyeing vessel 303A is cooled to 65° C. following with 30 minutes of rinsing to remove the unfixed dyestuff.

Figure 11:
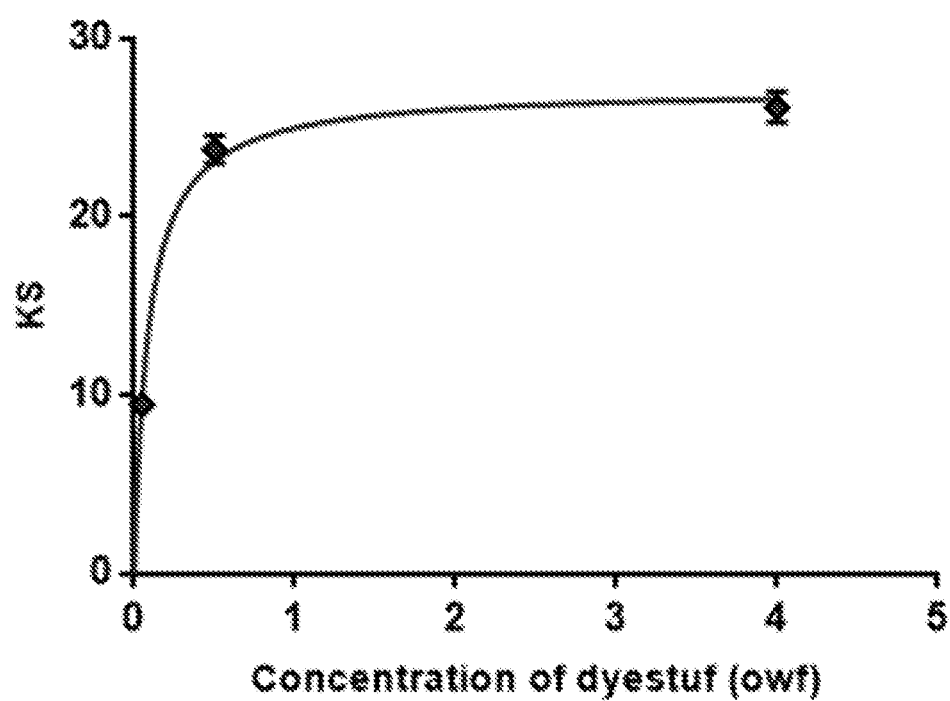
FIG. 11 is a diagram showing the K/S curve of dyed textiles as described in Example 1.

By carrying out physical tests, the performance of the dyeing process can be evaluated. FIG. 11 shows the relationship between the average K/S values and different concentrations of DR1 in Example 1. For the three textile samples (0.05% owf, 0.5% owf, and 4% owf), the average K/S values are 9.5 (±0.38), 23.8 (±0.77), and 26.2 (±0.85) respectively with λmax=520 nm, measured by X-rite Ci7600 bench top spectrophotometer. The textile samples can also pass the other tests, such as color fastness to washing (AATCC61), color fastness to dry cleaning (AATCC132), color fastness to perspiration (AATCC15), color fastness to water (AATCC107), color fastness to crocking (AATCC8), color fastness to light (AATCC16), and tearing strength (ASTM D1424). The three textile samples score greater than 3 in color staining to cotton and polyester of AATCC61, AATCC 132, AATCC15 and AATCC107; and greater than 3.5 in AATCC8 and AATCC16.

EXAMPLE 2

Figure 12:
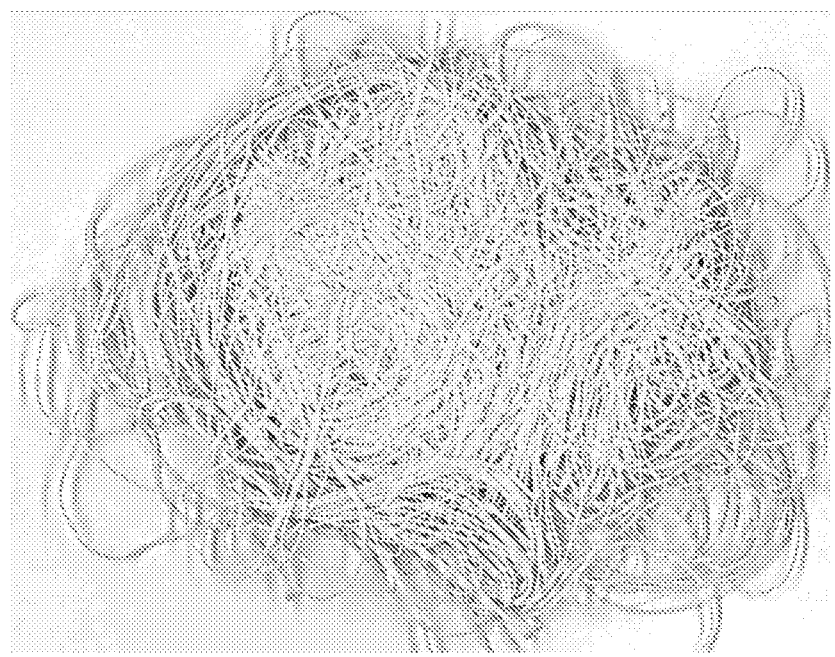
FIG. 12 shows the dyed yarn cone as described in Example 2.

FIG. 12 shows the dyed yarn for Example 2. The photo in FIG. 12, although depicted in grayscale (not shown in color), is light yellow in color with hex #feef19.

The textile sample used in Example 2 is a 100% PET yarn cone, which is dyed with a disperse yellow (DY1) using the dyeing method and system of the present disclosure. In the dyestuff vessel 302, 0.5% owf DY1 is added to the mesh basket 405. For the dyeing batch, 20 kg of textile sample is put into the yarn beam 801, and the yarn dyeing vessel 303C is operated at 120° C. and 240 bar with 3 hours of circulation using the circulation pump 304. An alternating flow with an interval of 60 minutes is used, such that the Sc—$CO_2$ 206 enters the yarn dyeing vessel 303C from two different directions. After dyeing, the yarn dyeing vessel 303C is cooled to 70° C. following with 45 minutes of rinsing to remove the unfixed dyestuff.

By carrying out physical tests, the performance of the dyeing process can be evaluated. The average K/S value for the textile sample of Example 2 is 18.4 (±0.66) with λmax=400 nm, measured by X-rite Ci7600 bench top spectrophotometer. The textile sample can also pass the other tests, such as AATCC61, AATCC132, AATCC15, AATCC107, AATCC8, AATCC16, and ASTM D1424. In AATCC61, AATCC 132, AATCC15 and AATCC107, the scores are greater than 4.5 in color staining to cotton and polyester, and greater than 4 in AATCC8 and AATCC16.

EXAMPLE 3

Figure 13:
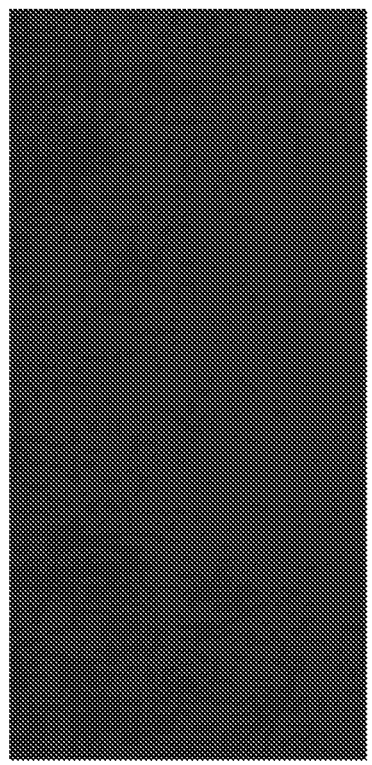
FIG. 13 shows the color sample of the dyed product as described in Example 3.

FIG. 13 shows the color sample of the dyed garment for Example 3. The image in FIG. 13, although depicted in grayscale (not shown in color), is navy blue in color with hex #043484.

The textile sample used in Example 3 is a 100% PET garment, which is dyed with a disperse blue (DB1) using the dyeing method and system of the present disclosure. In the dyestuff vessel 302, 4% owf DB1 is added to the mesh basket 405. For the dyeing batch, 1 kg of textile sample is put into the garment basket 601, and the garment dyeing vessel 303B is operated at 130° C. and 250 bar with 4 hours of circulation using the circulation pump 304. An alternating flow with an interval of 45 minutes is used, such that the Sc—$CO_2$ 206 enters the garment dyeing vessel 303B from two different directions. After dyeing, the garment dyeing vessel 303B is cooled to 70° C. following with 60 minutes of rinsing to remove the unfixed dyestuff.

By carrying out physical tests, the performance of the dyeing process can be evaluated. The average K/S value for the textile sample of Example 3 is 20.3 (±0.27) with λmax=650 nm, measured by X-rite Ci7600 bench top spectrophotometer. The textile sample can also pass the other tests, such as AATCC61, AATCC132, AATCC15, AATCC107, AATCC8, AATCC16, and ASTM D1424. In AATCC61, AATCC 132, AATCC15 and AATCC107, the scores are greater than 4.5 in color staining to cotton and polyester, and greater than 3.5 in AATCC8 and AATCC16.

EXAMPLE 4

Figure 14:
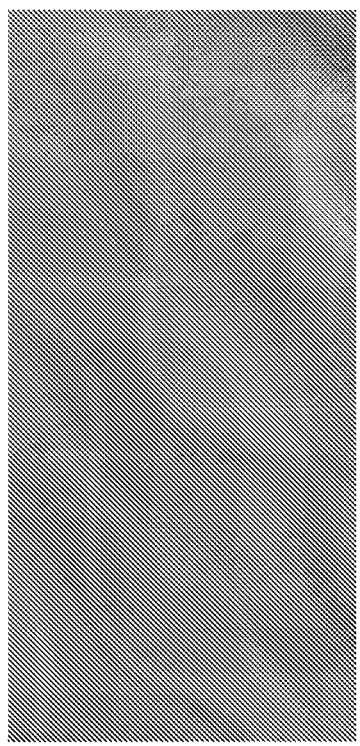
FIG. 14 shows the color sample of the dyed product as described in Example 4.

FIG. 14 shows the color sample of the dyed fabric for Example 4. The image in FIG. 14, although depicted in grayscale (not shown in color), is pumpkin in color with hex #fa8322.

The textile sample used in Example 4 is a 100% cotton fabric, which is dyed with a reactive disperse yellow (RDY1) using the dyeing method and system of the present disclosure. In the dyestuff vessel 302, 4% owf RDY1 is added to the mesh basket 405. For the dyeing batch, 15 kg of textile sample is put into the fabric beam 502. Also, 3 wt % of methanol with respective to the weight of Sc—$CO_2$ is added into the dyeing system 300 through a pressurizing pump 310. The fabric dyeing vessel 303A is operated at 90° C. and 270 bar with 4 hours of circulation using the circulation pump 304. An alternating flow with an interval of 60 minutes is used, such that the Sc—$CO_2$ 206 enters the fabric dyeing vessel 303A from two different directions. After dyeing, the fabric dyeing vessel 303A is cooled to 70° C. following with 30 minutes of rinsing to remove the unfixed dyestuff.

By carrying out physical tests, the performance of the dyeing process can be evaluated. The average K/S value for the textile sample of Example 4 is 7.5 (±0.42) with λmax=520 nm, measured by X-rite Ci7600 bench top spectrophotometer. The textile sample can also pass the other tests, such as AATCC61, AATCC132, AATCC15, AATCC107, AATCC8, AATCC16, and ASTM D1424. In AATCC61, AATCC 132, AATCC15 and AATCC107, the scores are greater than 4 in color staining to cotton and polyester, and greater than 3 in AATCC8 and AATCC16.

EXAMPLE 5

Figure 15:
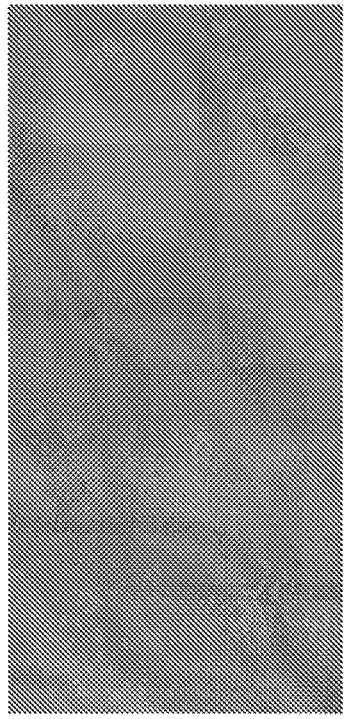
FIG. 15 shows the color sample of the dyed product as described in Example 5.

FIG. 15 shows the color sample of the dyed fabric for Example 5. The image in FIG. 15, although depicted in grayscale (not shown in color), is pumpkin in color with hex #e47727.

The textile sample used in Example 5 is a blend fabric of 50% PET and 50% cotton, which is dyed with a reactive disperse yellow (RDY1) using the dyeing method and system of the present disclosure. In the dyestuff vessel 302, 4% owf RDY1 is added to the mesh basket 405. For the dyeing batch, 15 kg of textile sample is put into the fabric beam 502. Also, 6 wt % of methanol with respective to the weight of Sc—$CO_2$ is added into the dyeing system 300 through a pressurizing pump 310. The fabric dyeing vessel 303A is operated at 90° C. and 280 bar with 4 hours of circulation using the circulation pump 304. An alternating flow with an interval of 60 minutes is used, such that the Sc—$CO_2$ 206 enters the fabric dyeing vessel 303A from two different directions. After dyeing, the fabric dyeing vessel 303A is cooled to 70° C. following with 60 minutes of rinsing to remove the unfixed dyestuff.

By carrying out physical tests, the performance of the dyeing process can be evaluated. The average K/S value for the textile sample of Example 4 is 8.0 (±0.48) with λmax=470 nm, measured by X-rite Ci7600 bench top spectrophotometer. The textile sample can also pass the other tests, such as AATCC61, AATCC132, AATCC15, AATCC107, AATCC8, AATCC16, and ASTM D1424. In AATCC61, AATCC 132, AATCC15 and AATCC107, the scores are greater than 4 in color staining to cotton and polyester, and greater than 3 in AATCC8 and AATCC16.

What is claimed is:

1. A system for dyeing multiple forms of textile using liquefied $CO_2$, the system comprising:
    a first pressurizing pump for pressurizing the liquefied $CO_2$ to obtain pressurized liquefied $CO_2$;
    a heater for heating the pressurized liquefied $CO_2$ to obtain supercritical $CO_2$ (Sc—$CO_2$);
    a dyestuff vessel for mixing a dyestuff and the Sc—$CO_2$ by an internal circulation inside the dyestuff vessel to obtain Sc—$CO_2$-mixed dyestuff;
    a dyeing vessel for receiving the Sc—$CO_2$-mixed dyestuff from the dyestuff vessel and receiving the Sc—$CO_2$ through a bypass channel independent of the dyestuff vessel;
    a circulation pump for continuously circulating the Sc—$CO_2$ and the Sc—$CO_2$-mixed dyestuff between the dyeing vessel and the dyestuff vessel for dyeing the textile;
    one or more cyclone separators for removing the dyestuff from the Sc—$CO_2$-mixed dyestuff to obtain separated liquefied $CO_2$,
    a second pressurizing pump for pressurizing $CO_2$ to the liquefied $CO_2$; and
    a liquefied $CO_2$ storage vessel for storing the liquefied $CO_2$ and the separated liquefied $CO_2$ from the one or more cyclone separators,
    wherein the system further comprises a back pressure regulator for allowing a flow of the Sc—$CO_2$ and the Sc—$CO_2$-mixed dyestuff to the one or more cyclone separators when a pressure of the system is higher than an expected range,
    wherein the back pressure regulator is disposed between the circulation pump and the one or more cyclone separators and directly connects to both the circulation pump and the one or more cyclone separators.

2. The system of claim 1 further comprising a third pressurizing pump for pressurizing an alcoholic solvent, wherein:
    the alcoholic solvent is selected from the group consisting of methanol, ethanol, and a combination thereof; and
    the dyestuff is a reactive disperse dye.

3. The system of claim 1, wherein the dyestuff vessel comprises a motor, a mesh basket, one or more stirrer blades, and a heating jacket.

4. The system of claim 1, wherein the dyeing vessel for dyeing a fabric textile comprises a fabric beam, an inlet and an outlet for circulating the Sc—$CO_2$, and a heating jacket.

5. The system of claim 1, wherein the dyeing vessel for dyeing a garment textile comprises a garment basket, a garment vessel, a heating jacket, an inlet and an outlet for circulating the Sc—$CO_2$, and a motor.

6. The system of claim 1, wherein the dyeing vessel for dyeing a yarn textile comprises a yarn beam, a heating jacket, and an inlet and an outlet for circulating the Sc—$CO_2$.

* * * * *